UNITED STATES PATENT OFFICE.

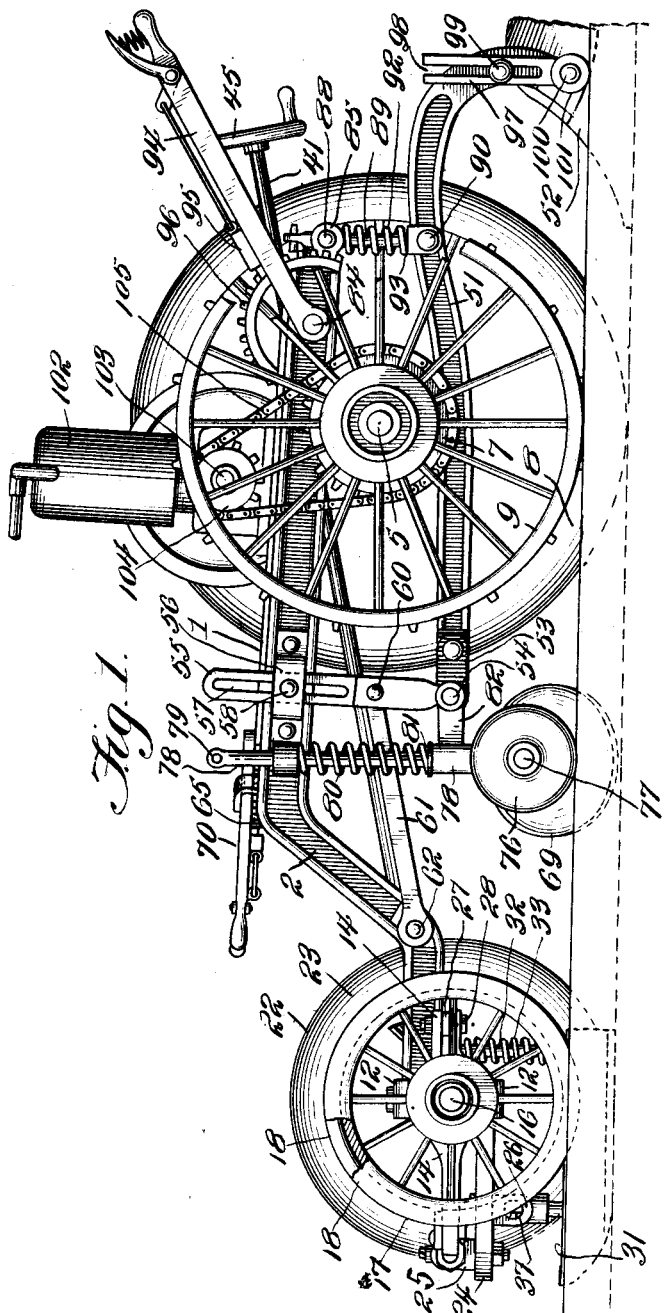

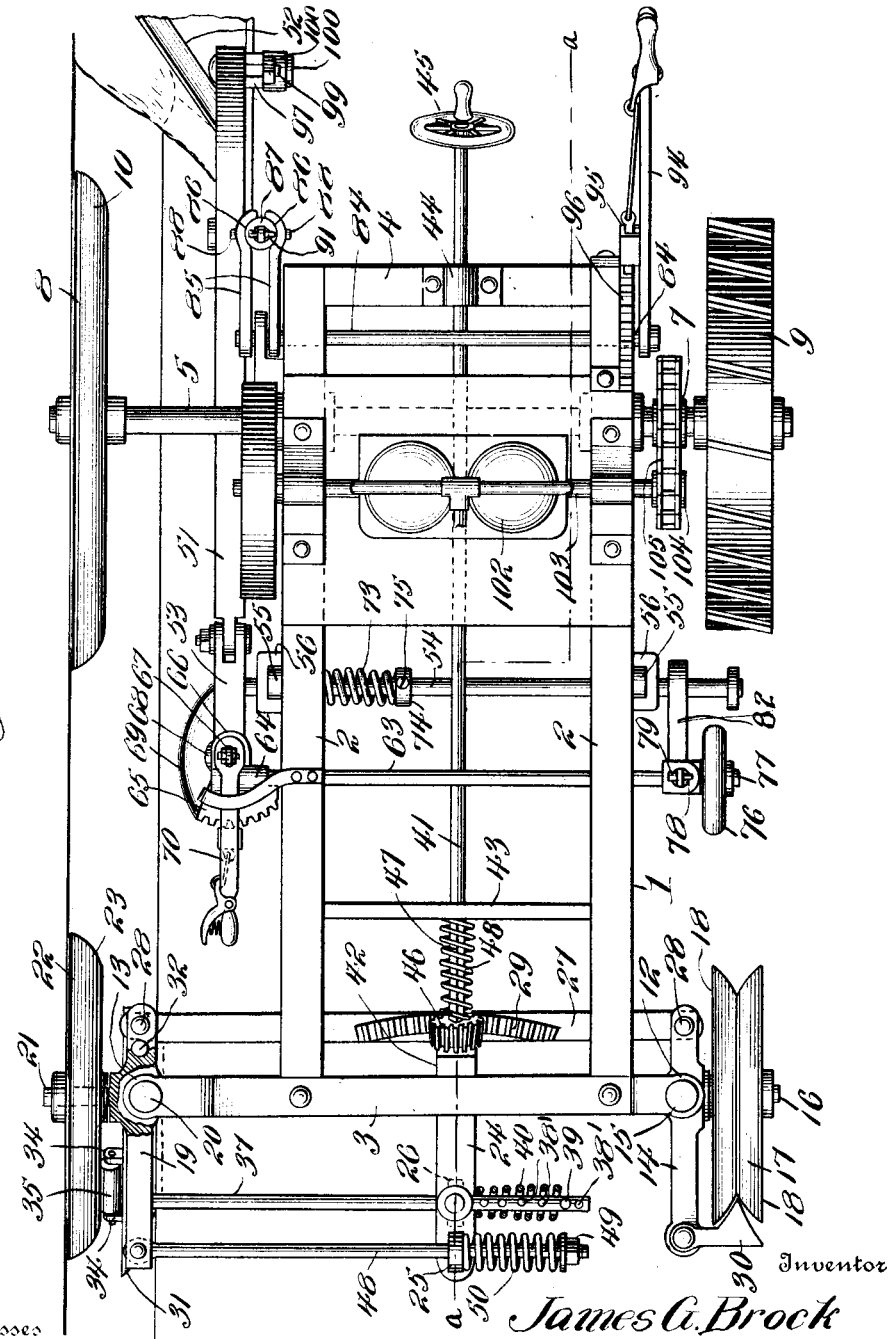

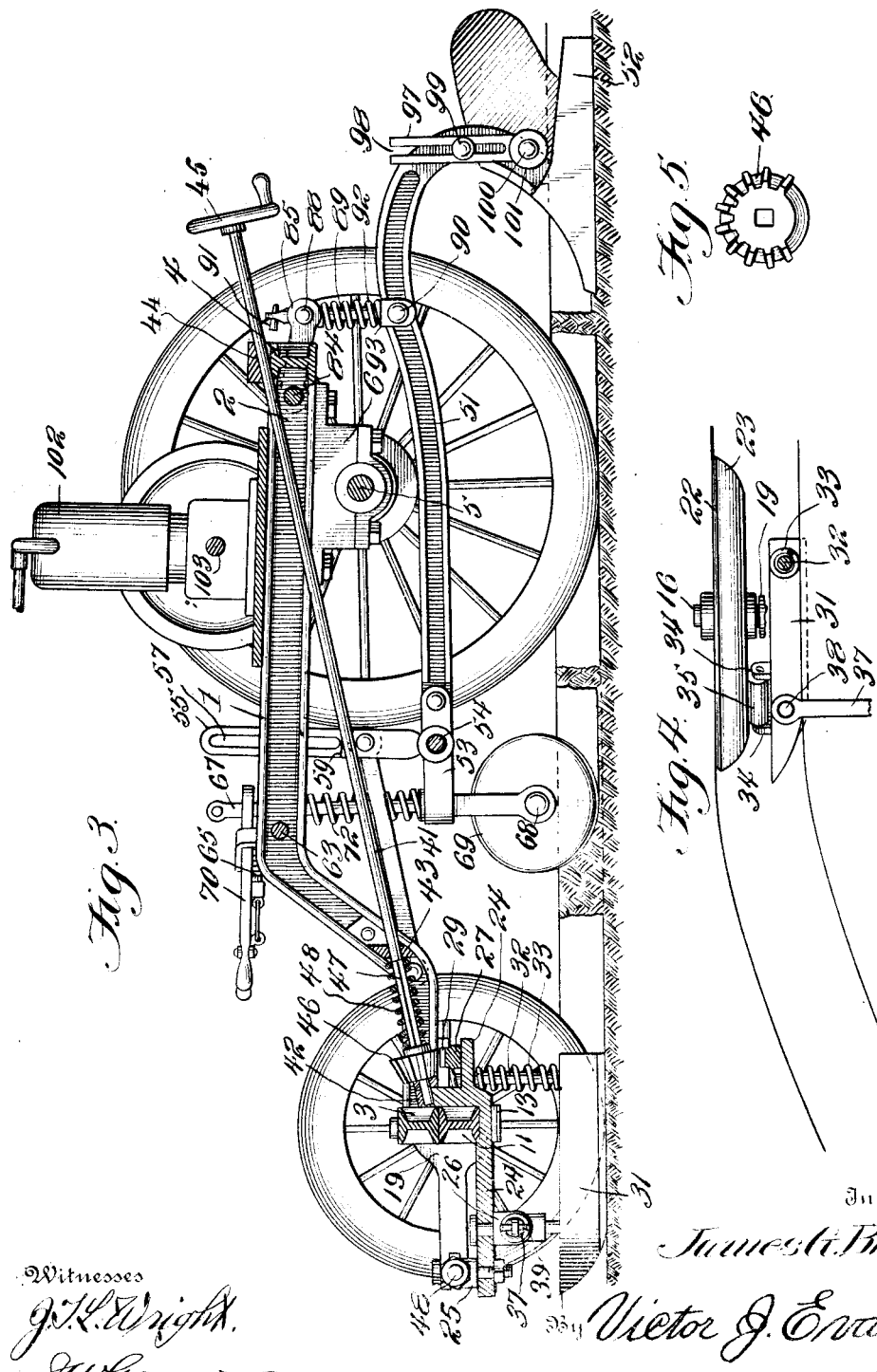

JAMES G. BROCK, OF ANADARKO, OKLAHOMA.

PLOW.

1,079,832.  Specification of Letters Patent. Patented Nov. 25, 1913.

Application filed April 27, 1912. Serial No. 693,641.

*To all whom it may concern:*

Be it known that I, JAMES G. BROCK, a citizen of the United States, residing at Anadarko, in the county of Caddo and State of Oklahoma, have invented new and useful Improvements in Plows, of which the following is a specification.

This invention is an improved motor plow adapted for use in breaking up land and also for cultivating growing crops, the object of the invention being to provide an improved plow of this kind which may be very readily operated and controlled, enables the use of horses for plowing to be dispensed with and which may be readily guided and may be arranged to plow at any desired depth.

One object of my invention is to effect improvements in the construction of the means for directing or guiding the plow so as to keep the plow share or shares at work in the furrows and hold the plow to its work when operating on side hills.

Another object of the invention is to provide improved means for adjusting the plow share or shares to work at any desired depth.

Another object is to provide improved means for controlling and holding the beam or beams of the plow or plows.

With the above and other objects in view, the invention consists in the construction, combination and arrangement of parts, set forth in and falling within the scope of the appended claims.

In the drawings: Figure 1 is a side elevation of a motor plow constructed in accordance with my invention. Fig. 2 is a plan of the same. Fig. 3 is a vertical longitudinal sectional view on the plan indicated by the line *a—a* of Fig. 2. Figs. 4 and 5 are detail views.

The frame 1 of my improved motor plow comprises a pair of side bars 2 which have their front portions curved downwardly and forwardly, a cross bar 3 which connects the front ends of the said side bars and a cross bar 4 which connects the rear ends thereof. An axle shaft 5 is mounted for rotation in bearings 6 which are secured to the under sides of the side bars at a suitable distance from the rear end of the frame and this axle shaft is provided with a suitable driving element, such, for instance, as a sprocket wheel
7. On one end of the axle shaft, at the right hand side of the motor plow is a furrow wheel 8. A land wheel 9 is on the other end of the axle shaft. The furrow wheel has its rim beveled on its inner side as at 10, to enable the furrow wheel to cut and run in the furrow. The diameter of the furrow wheel is greater than that of the land wheel so that when the motor plow is at work, with the furrow wheel running in the bottom of a furrow and the land wheel operating on the unplowed land, the frame of the motor plow will be level or substantially so.

A fixed front axle member 11 is secured to the under side of the frame 1, at the front end of the said frame and is provided at its ends with pairs of left and right spaced lugs 12—13. An arm 14 is pivotally mounted between the lugs 12, the pivot pin 15 being vertical and the said arm has an outwardly extending spindle 16 on which is mounted the front land wheel 17. This land wheel is provided at opposite sides with peripheral flanges 18 which serve to cut into the ground, prevent the front end of the machine from moving sidewise and, hence, this wheel assists in guiding or directing the machine and prevents it from sliding when in operation on the hillside, thereby materially assisting in keeping the plow or plows at work in the furrows. An arm 19 which is similar in construction to the arm 14 is pivotally mounted between the lugs 13, on the furrow side of the machine, the pivot pin 20 being vertical. This arm 19 is provided with an outwardly projecting spindle 21 on which is mounted the front furrow wheel 22, the said furrow wheel being of greater diameter than the front land wheel 17 and its rim being beveled on its inner side as at 23 to assist the furrow wheel in maintaining its place in the furrow.

The bracket 24 is secured to the under side of the fixed front axle member 11, at the center thereof, is arranged longitudinally and projects forwardly and also rearwardly from the said front fixed axle member. A guide 25 is pivotally mounted on the upper side of the front portion of the bracket 24. A similar guide 26 is pivotally mounted on the under side of the said bracket 24 at a suitable distance in rear of the guide 25. The rear ends of the arms 14—19 which carry the front wheels of the motor plow are connected together by a steering bar 27, the said bar being pivotally connected to the said arms as at 28. This bar operates on the rear portion of the bracket 24 and is provided on its upper side with a curved rack 29. It will be understood that the steering bar in connection with the arms 14—19 holds the front wheels 17—22 parallel with each other under all conditions and enables them to be turned as may be required to guide the machine in any desired direction and hold the same to its work when plowing. At the front end of the arm 14 is a scraper 30 which engages the periphery of the wheel 17 and keeps the latter clear of adhering earth.

To prevent clods from getting in the way of and interfering with the action of the front furrow wheel 22, I provide a fender shoe 31 which is arranged near the inner side of the said front furrow wheel and is provided near its rear end with an upwardly extending vertical spindle 32 which extends through a vertical opening with which the arm 19 is provided near its rear end. This spindle thus connects the fender shoe to the said arm 19 for angular movement laterally or in a horizontal plane and also for vertical movement, the spindle 32 being vertically movable in the said opening of the said arm 19, and to hold the said fender shoe down to its work at the bottom of a furrow, I provide a coiled spring 33 which is arranged on the said spindle and bears between the lower side of the arm 19 and the upper side of the fender shoe. The fender shoe is provided on its outer side, at suitable points, with a pair of outstanding lugs 34 in which an anti-friction roller 35 has its bearings, the said anti-friction roller serving to engage the inner side of the front furrow wheel 22. The front end of the fender shoe extends forwardly, beyond the said front furrow wheel and any clod which might otherwise be encountered by said furrow wheel is caught by the fender shoe before the said furrow wheel reaches it, and is either crushed and broken by the fender shoe or else is moved to one side out of the path of said furrow wheel. In order to adjustably hold the said fender shoe in the required position for operation, I provide a bar 37 which has one end pivotally connected to the fender shoe as at 38. This bar is arranged substantially parallel with the front axle member 11 and extends through and operates in an opening in the guide 26. The said bar is also provided with a series of adjusting openings 38' any one of which may be engaged by a suitable stop pin 39. A coiled extensile spring 40 is disposed on the said bar 37 and bears between the guide 26 and the said stop pin and, hence, coacts with the said guide and stop pin to adjustably and to also yieldably hold the fender shoe in operative position. By reason of the provision of the adjusting openings and stop pin, the fender shoe may be set at any desired angle with respect to the front furrow wheel, as will be understood.

A steering shaft 41 extends longitudinally through the frame 1, has its front end mounted in a bearing 42 with which the bracket 24 is provided and the said steering shaft is also mounted in a bearing in a cross bar 43 of the frame 1 and a bearing 44 on the rear cross bar 4 of said frame. A lever 45 or any other suitable means is, in practice, provided to enable the steering shaft to be turned as may be required, and the steering shaft has near its front end a beveled pinion 46 which is slidably mounted and fitted on a cross sectionally angular portion 47 of said shaft. The said pinion is normally held in engagement with the rack 29 by means of a spring 48, but when pressed rearwardly, against the tension of the said spring, may be disengaged from said rack to enable the pinion to be reset, in another position on the steering shaft 41, prior to reëngagement with the rack.

It will be understood that by turning the steering shaft its pinion is caused to make a partial rotation and said pinion being engaged with the rack bar of the steering bar 27, the latter is moved lengthwise so as to cause the arms 14—19 to be turned on their pivots and thus turn the wheels 17—22 in the desired direction. To assist in holding the front wheels in the desired position, when the plow is in operation, the arm 19 is pivotally connected at its front end to a bar 48 which operates in the guide 25. An adjusting nut 49 is screwed on the said bar and a cushioning spring 50 which is arranged on said bar bears between the said guide and the said adjusting nut. In the event, when the machine is in operation, that the front furrow wheel or the fender shoe should strike an unyielding obstruction such as a stone or root, the spring 50 will permit the arm 19 to turn a sufficient distance to enable the furrow wheel or shoe to clear the obstruction without being injured thereby.

In practice, my improved motor plow may include or be provided with any suitable number of turning or cultivating plows. For the purposes of this specification, I show a plow beam 51 which is arranged near the rear furrow wheel 8 and carries a share 52. The front end of this plow beam is pivotally connected to a block 53, so that the rear end of the plow beam may be raised and lowered and this block is mounted on one end of a transverse shaft 54 which shaft extends through the lower ends of and is carried by a pair of vertically movable standard links 55. These standard links operate in and are held in place by guides 56 and are provided with vertical slots 57 through which extend screws 58, the said slots and screws coacting to limit the downward movement of said standard links, their upward movement being limited by shoulders 59 with which they are provided and which are adapted to come in contact with the under sides of the side bars 2 of the frame 1.

Where a number of plows are employed, as a gang, in connection with my improved motor plow, their beams may be pivotally connected to the bar 54. The standard links 55 are pivotally connected as at 60 to the rear ends of rock links 61, the front ends of which are pivotally connected, as at 62 to the downturned front portions of the bars 2 of the frame 1. Owing to the fact that the standard links 55 are vertically movable, the transverse shaft 54 which they carry and to which the front end of the beams of the plows are pivotally connected may move vertically to enable the roller 76 and colter 69 to conform to inequalities of the surface of the ground and to pass over obstructions.

The bar 63 is arranged transversely of the frame 1 and extends through openings in its bars 2. At the furrow end of the said bar 63 is a block 64 which has a segment rack 65 on its front side and also has near its rear end, a vertical bearing 66 for a standard shaft 67. This standard shaft also extends through a vertical opening in the block 53 and is provided at its lower end, on its furrow side, with an inclined spindle 68 on which is mounted a rolling colter 69. This colter runs ahead of the share 52 and its spindle may be turned to any desired angle, by turning the standard shaft, the function of the colter being to serve as a guide for the share, as will be understood. The standard shaft may be turned to any desired position or angle by means of a lever arm 70 which is loosely connected to the upper portion thereof, said lever arm having an angular opening, and the upper portion of said standard shaft being correspondingly cross sectionally shaped and extending through said opening and the said lever arm is provided on its under side with a locking tongue or tooth which may be engaged with any one of the rack teeth of the segment 65.

To hold the colter down to its work and keep it bearing on the surface of the land, ahead of the share, I provide a coiled extensile spring 72 which is arranged on the standard shaft and bears between the block 53 and the bearing 66. The bar 54 is movable in the direction of its own length in the openings in the lower ends of the standard links 55 and is held normally against such movement by the action of a spring 73 which is arranged on said bar and bears between the right hand standard link and an adjusting collar 74 which is secured on said rod by an adjusting screw 75.

A roller 76 which is arranged at the land side of the machine is mounted on a horizontal spindle 77 at the lower end of a vertically movable standard 78. This standard has its upper portion extending through a vertical opening at the land end of the bar 63 and its downward movement is limited by a stop pin 79. A spring 80 is arranged on this standard and bears between the said bar 63 and a shoulder 81 with which said standard is provided and from the rear side of the said shoulder projects an arm 82 which has an opening through which extends one end of the bar 54. It will be understood that the spring 80 acts to keep the roller 76 pressed downwardly to cause said roller to engage the surface of the land. A rock shaft 84 is arranged horizontally near the rear end of the frame 1 and is mounted in suitable bearings in the side bars of said frame. This rock shaft is provided at its furrow end with a pair of rock arms 85 which are secured thereto for angular movement therewith. These rock arms which extend rearwardly from said shaft have recesses 86 in their opposing sides and between them, in said recessed portions, is mounted a pivoted guide 87, the pivots of which are shown at 88. A link 89 has its lower end pivoted as at 90 to one side of the plow beam 51 and the said link extends upwardly through the guide 87 and is provided with a stop pin 91 to limit its downward movement. A spring 92 is arranged on the said link and bears between the said guide and a shoulder 93 near the lower end of said link. A lever 94 is attached to one end of the rock shaft and enables the latter to be turned so as to cause the arms 85 by the connections hereinbefore described to raise or lower the rear end of the beam 51 and, hence, raise or lower the plow share as may be required. This lever has a locking bolt 95 of usual construction which may be engaged with a segment 96 carried by the frame 1 so as to lock the rock shaft and, hence, the plow at any desired adjustment.

It will be understood that while the spring 92 keeps the plow share pressed downwardly when the plow is at work, the said spring enables the plow to spring upwardly against the tension of the said spring in the event that it should strike a stone or root, thus avoiding breakage.

To cause the plow to operate at any desired depth in the soil, I provide the beam and standard of the plow, on the inner or land side thereof, with a vertically adjustable arm 97 which has a vertical slot 98 and is adjustably secured to the standard portion of the beam by a clamping bolt 99. This arm has a spindle 100 on its inner side near its lower end on which operates a roller 101 which bears on the ground on the land side of the furrow cut by the share 52. It will be understood that by adjusting the arm 91 the share may be caused to run at any desired depth in the ground.

Within the scope of my invention any suitable power may be employed for driving and operating my motor plow. For the purposes of this specification, I show a gasolene engine 102 of usual construction mounted on the frame 1 and the driving shaft 103 of which is provided with a sprocket wheel 104, the said sprocket wheel being connected by an endless sprocket chain 105 to the sprocket wheel 5 of the axle shaft. Any suitable means may be employed for lubricating the various parts of my motor plow.

By properly providing the motor plow with a suitable number of plows with their beams and shares or cultivator plates and by properly adjusting the plows, my motor plow may be used for various purposes such as for breaking up the ground or for plowing growing crops or for preparing the ground for planting listed corn. I do not limit myself in this particular.

While I have herein shown and described what I now consider a preferred form of my invention, I would have it understood that changes may be made in the form, proportion and construction of the several parts without departing from the spirit of my invention and within the scope of the appended claims.

I claim:—

1. In a plow of the class described, the combination of a wheeled frame, a plow beam connected to the frame for vertical movement, a rolling colter having a vertical standard shaft pivotally connected to the plow beam and also vertically movable with respect thereto, a guide on the frame for the said standard shaft, and means to turn said standard shaft to adjust the rolling colter angularly with respect to the line of draft.

2. In a plow of the class described, the combination of a wheeled frame, a plow beam connected to the frame for vertical movement, a rolling colter having a vertical standard shaft pivotally connected to the plow beam and also vertically movable with respect thereto, a guide on the frame for the said standard shaft, means to turn said standard shaft to adjust the rolling colter angularly with respect to the line of draft, and a spring exerting downward pressure on the plow beam.

3. In a plow of the class described, the combination of a wheeled frame, a plow beam connected to the frame for vertical movement, a rolling colter having a vertical standard shaft pivotally connected to the plow beam and also vertically movable with respect thereto, a guide on the frame for the said standard shaft, means to turn said standard shaft to adjust the rolling colter angularly with respect to the line or draft, a spring exerting downward pressure on the plow beam, and a spring arranged on the standard shaft and bearing between the guide and the plow beam.

In testimony whereof I affix my signature in presence of two witnesses.

JAMES G. BROCK.

Witnesses:
 C. R. JOHNSTON,
 GEO. GOODIN.